United States Patent [19]

Kardinal

[11] Patent Number: 4,516,888

[45] Date of Patent: * May 14, 1985

[54] PNEUMATIC DISPATCH SYSTEM HAVING A PLURALITY OF FORWARDING TUBE PATHS AND AN ARRANGEMENT TO TRANSFER BETWEEN TWO TUBE PATHS

[75] Inventor: Hans-Joachim Kardinal, Berlin, Fed. Rep. of Germany

[73] Assignee: Siemens Aktiengesellschaft, Berlin & Munich, Fed. Rep. of Germany

[ * ] Notice: The portion of the term of this patent subsequent to Mar. 20, 2001 has been disclaimed.

[21] Appl. No.: 466,895

[22] Filed: Feb. 16, 1983

[30] Foreign Application Priority Data

Feb. 17, 1982 [DE] Fed. Rep. of Germany ....... 3206075

[51] Int. Cl.³ ............................................. B65G 51/24
[52] U.S. Cl. ...................................... 406/182; 406/74
[58] Field of Search ........... 406/1, 2, 63, 74, 110-112, 406/182

[56] References Cited

U.S. PATENT DOCUMENTS 141,294  7/1873  Siemens ................................ 406/74
4,437,797  3/1984  Kardinal ............................ 406/110

FOREIGN PATENT DOCUMENTS 2600619  7/1976  Fed. Rep. of Germany ...... 406/182
2618407  11/1977  Fed. Rep. of Germany ...... 406/110

Primary Examiner—Jeffrey V. Nase
Attorney, Agent, or Firm—Hill, Van Santen, Steadman & Simpson

[57] ABSTRACT

A pneumatic dispatch system having a plurality of forwarding tube paths and an arrangement for transferring a dispatch case between two paths including a pair of pneumatic post stations interconnected by a single tube line characterized by each of the pneumatic post stations having a first tube chamber connected to a second tube chamber which extends parallel thereto and forms a reception chamber. The two tube chambers move within a housing of the station between a first position with the first chamber aligned with the tube sections forming the forwarding tube path and the second reception chamber being in alignment with the connecting tube to a second position with the second chamber being in a position to catch and retain a dispatch case traveling in the path. Preferably, each of the stations is provided with a feed line which has a valve to enable control of flow therein with the feed line extending between a tube section of the forwarding tube path and a port or air passage connected to the interior of the second chamber. If the valve is a three-way valve, the interior of the chamber can be selectively connected through the feed line to either the air in the system or the outside air.

18 Claims, 3 Drawing Figures

PNEUMATIC DISPATCH SYSTEM HAVING A PLURALITY OF FORWARDING TUBE PATHS AND AN ARRANGEMENT TO TRANSFER BETWEEN TWO TUBE PATHS

BACKGROUND OF THE INVENTION

The present invention is directed to a pneumatic dispatch system comprising a plurality of forwarding tube paths, each of which is formed of tubular sections arranged in a single tube line for transporting pneumatic dispatch cases and means for pneumatically transporting the dispatch case in both directions along each tube line in a single-tube commutation mode. The system has connecting arrangements for interconnecting two of the forwarding tube paths which connecting arrangement includes each path having a pneumatic post station which is inserted between two tube sections of the single tube line and a connecting tube line extending between the two post stations, each of the post stations will have at least a first tube chamber which is open at each end and means for moving the first tube chamber between a first position in alignment with the two tube sections of the forwarding tube path and a second position out of alignment therewith.

A known pneumatic dispatch system which has a connecting arrangement for interconnecting two separate forwarding tube lines or paths is disclosed in German OS No. 2,618,407. In this German reference, two pneumatic post stations of each connecting device are formed by pneumatic post stations having a dispatch store placeable both in alignment with an introduction opening in a housing of the station as well as a forwarding tube connected to the pneumatic post station. The introduction opening is connected to a connecting line which will lead to the other forwarding tube path. The connecting tube or line must thereby either by introduced into the other forwarding tube path through a shunt arrangement or is connected so that it respectively represents the end area of the other forwarding tube path.

SUMMARY OF THE INVENTION

The present invention is directed to providing an improved pneumatic dispatch system having a plurality of forward tube paths which system has complete liberty concerning the position and the orientation of the pneumatic post stations of a connecting means which interconnect two of the forwarding tube paths without requiring a connecting shunt.

To accomplish these goals, the present invention is directed to an improvement in a pneumatic dispatch system having a plurality of forwarding tube paths or trains, each tube path comprising a plurality of tubular sections arranged in a single tube line for transporting pneumatic dispatch cases and means for pneumatically transporting the dispatch cases in both directions along each tube line in a single tube commutation mode, said system having connecting means for selectively connecting two forwarding tube paths, said connecting means comprising each of the tube paths having pneumatic post stations with a housing inserted between two tube sections of the single tube line and a connecting tube line extending between the housings of the two post stations, each of said post stations having a first tube chamber open at each end and means for moving the first tube chamber in said housing between a first position in alignment with the two tube sections of the forwarding tube path and a second position out of alignment therewith. The improvements comprise each of the first chambers being connected to a second tube chamber extending parallel thereto, said second tube chamber being a reception chamber having one open end and a second end provided with retaining means for blocking passage of a pneumatic dispatch case being pneumatically transported in the tube when the second chamber is aligned with the tube sections of the forwarding tube path and retaining the case in said second chamber, and said connecting tube line being connected to the housing of each station at a distance from the tube section equal to the spacing between the axis of the first and second chambers so that when the first chamber is in the first position, the one open end of the reception chamber is aligned with the connecting line for transfer of a case therebetween.

In contast to known pneumatic dispatch systems, the pneumatic dispatch system requires no control tube plug device for the pneumatic separation of one forwarding tube path from the other. The attitude or orientation for each of the two pneumatic post stations is also entirely free to be positioned as desired. Thus, total liberty concerning the selection of the position, orientation and disposition of the two pneumatic post stations forming the connecting device is given with simple means.

The air stream required for transporting the dispatch case between the two reception tube chambers of the two pneumatic post stations of a connecting device can be accomplished in various ways. Shared by all of these variations is the reception tube chamber of at least one of the two pneumatic post chambers being connected to the desired portion of a tube section of the forwarding tube path by port means which have an aperture in communication with the interior of the reception chamber at a point spaced from the one open end and have a passage which is in communication with a feed line that extends into communication with a tube section of the forwarding tube path which feed line has a switchable valve which is preferably a three-way valve having a port that is also in communication with outside or ambient air. Since only one of the reception tube chambers of one of the two post stations needs to be connected to the air pressure in its associated forwarding tube path, the reception tube chamber of the other pneumatic post station can be in communication with the outside air when it is positioned to be aligned with the connecting tube line. Thus, the air stream required for transporting a case between the two reception chambers is only needed to be provided from one of the two forwarding tube trains through the valve and feed line with the other valve in the other station being connected to the outside air. With this arrangement, each of the two forwarding tube paths which are connected together by the connecting means can be transversed in either direction with a single tube commutation mode. Such change in direction is solely dependent on which one of the two forwarding tube paths is utilized to provide the air stream for the transfer operation.

Insofar as both pneumatic post stations of the single connecting means are directed at least approximately vertically, the delivery transport to a pneumatic post station wherein the open end area of the reception tube points up can also be executed without an air stream strictly by utilizing the forces of gravity to receive the case from a station positioned thereabove.

Since both reception tube chambers of both pneumatic post stations are connected by a feed line to the respective forwarding tube path, the blower to be employed for supplying the air for the connecting traffic can be selected from the blower allocated to either of the two forwarding tube paths. Thus, the possibility of increasing the traffic load of the system exists because the blower of a particular forwarding tube path in which no traffic is occurring at the precise moment can be utilized. This is particularly advantageous when the connecting line between two pneumatic post stations is very long. In such a case, the reception tube chambers can be equipped with a blocking device which can mechanically arrest a received pneumatic traveler accepted from the connecting line until the reception tube chamber is introduced into a position aligned with a tube section of the forwarding tube path of that station. The release of the blocking device can therefore be derived from the displacement of the carrier member.

In order to enable complete liberty in the connecting traffic, it is desirable that the valve in the feed line is a three-way valve which will selectively connect the reception tube chamber to the area of either the forwarding tube path or to the outside ambient air.

Different solutions are also possible for the realization of the air stream incorporating at least one subarea of the reception tube chamber. For example, the blocking device is formed by a closure of the reception tube chamber functioning as a continuous web that extends across the chamber. This web when axially offset from an aperture of support means which communicate the interior of the chamber to the feed line will create an air pillow for decelerating an incoming pneumatic traveler or case. Insofar as the remaining pneumatic post station of the pneumatic dispatch system likewise provides a pneumatic deceleration of incoming dispatch cases, a pneumatic deceleration of the pneumatic dispatch case intended for the delivery traffic is likewise to be viewed as being advantageous. However, it is also possible to carry out the delivery traffic without the pneumatic deceleration and to protect the pneumatic post station of the connecting devices against dynamic loads which are too high in that the dispatch case intended for delivery between two forwarding tube paths are conveyed at a lower speed. Such a pneumatic post station of the connecting device without a pneumatic decleration of the incoming dispatch case can thereby be preferably realized when the retaining means is formed by a limited buffer having an air passage opening. This buffer is preferably a projection extending into the interior of the chamber and is provided with an impact dampening material.

A realization of the air line which is particularly favorable concerning the required dimensions of the pneumatic post station consists wherein the air channel emerges laterally from the reception tube chamber and proceeds in alignment relative to the reception tube chamber at the second end and is axially aligned therewith. Thus, when the reception tube chamber is introduced into alignment with the tube sections of the forwarding tube path, then the air stream proceeding through the entrance area of the reception tube chamber into the air line will emerge from its clearance into the aligned section of the forward tube path connected to the other side of the housing of the station. When, on the other hand, the reception tube chamber is situated in a position aligned with the connecting tube line, then the clearance of the air line is placed in front of an opening in the housing of the station which is connected either to the outside air or to a feed line extending to a tube section of the forwarding tube path. A friction-free delivery or transfer can be guaranteed by means of this access of the air line to the outside air or, respectively, to the tube section of the forwarding tube path.

A construction of the pneumatic post station which is particularly favorable in terms of manufacturing technology occurs according to the additional development of the invention in that the first tube chamber and the second tube chamber are disposed in a common carrier member which at least in the edge areas of the open ends of the first tube chamber and the one open end of the second tube chamber exhibit end faces which are aligned parallel to each other and parallel to adjacent side walls of the station housing. This design opens up particular advantageous possibilities with regard to the seals which are required at the tube sections of the forwarding tube paths to the pneumatic post section when in line with the chambers and for seals with the connecting tubes in the tube station housing. In this context, a further development of the invention provides that the sealing rings that surround the ports or joints of each of the tube sections of the forwarding tube path are provided on each of the side walls of the housing. The faultless seal which combines a long useful life with faultless operating conditions is achieved if resilient seating means are provided for each of these seals. The resilient seating means may be an annular groove which resiliently seats the seal ring or resilient mounting means which urge the ring resiliently against the face of the carrier member.

It is particularly advantageous if each of the two pneumatic post stations of each connecting means are identically designed. Thus, only a single structural type is required for the stations of each system.

It is also desirable and particularly advantageous to design the pneumatic post stations of each of the connecting means so that they correspond as greatly as possible to the remaining pneumatic post stations of the individual forwarding tube paths which do not serve in the connecting means, i.e., are provided for introducing and removing cases from the path. Thus, the post stations for the connecting means should differ from the other post stations by the slightest possible modifications. Additional examples of structure for pneumatic post stations are disclosed in my U.S. patent application Ser. No. 339,420, filed Jan. 15, 1982, which application issued as U.S. Pat. No. 4,437,797 and was based on German patent application No. 31 02 248.

DESCRIPTION OF THE PREFERRED EMBODIMENTS

Figure 1:
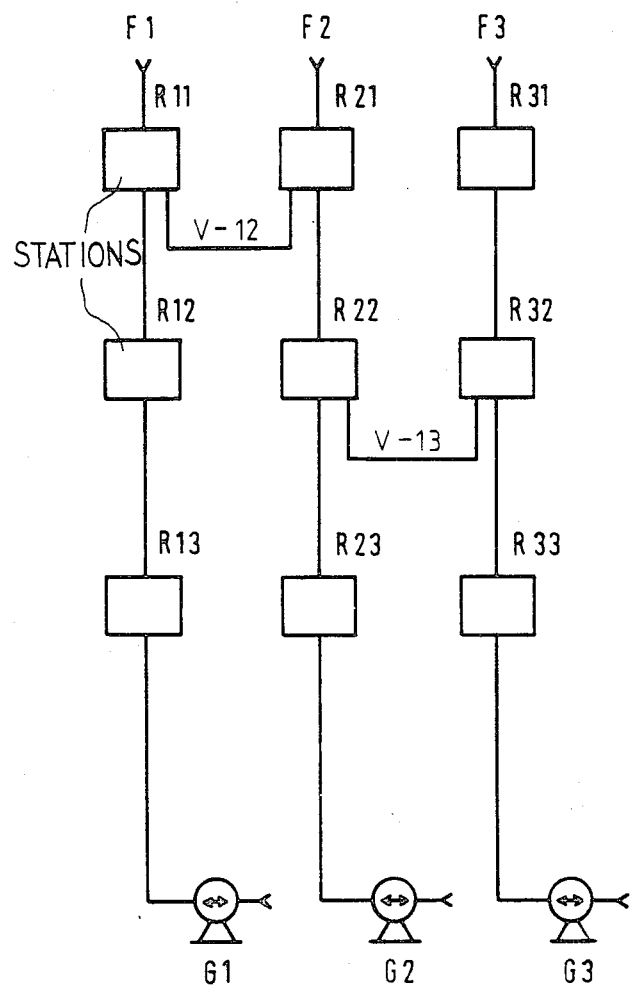
FIG. 1 is a diagrammatic presentation of a system in accordance with the present invention.

The principles of the present invention are particularly useful in a pneumatic dispatch system diagrammatically illustrated in FIG. 1. The system is illustrated as containing three forwarding tube paths F1, F2 and F3 which are each made up of a plurality of interconnected tubular sections which form a single tube line. In order to transport a pneumatic dispatch case or carrier in both directions along each of the single tube lines, each of the tube paths F1, F2 and F3 is provided with a blower G1, G2 and G3, respectively, which will create a flow of air in either direction as indicated by the arrows. Thus, the case can move in either direction and operates in a single tube commutation mode. As illustrated, each of the paths or tracks F1, F2 and F3 is provided with a plurality of post stations. As illustrated, the path F1 has post stations R11, R12 and R13, the path F2 has stations R21, R22 and R23 while the path or track F3 has stations R31, R32 and R33. As illustrated, the pneumatic post stations R11 and R21 and a connecting tube line V12 form connecting means for transferring a dispatch case between the line or path F1 and path F2. In a similar manner, the stations R22 and R32 are interconnected by a connecting tube line V13 and form a connecting means to transfer a case between the line F2 and F3. As illustrated, a transfer of traffic between the forwarding tube paths F1 and F3 does not occur directly but can only be accomplished by first passing a case between the lines F1 and F2 over the connecting means having the line V12 and then transferring the case from the line F2 to F3 through the connecting means having the connecting tube V13.

Figure 2:
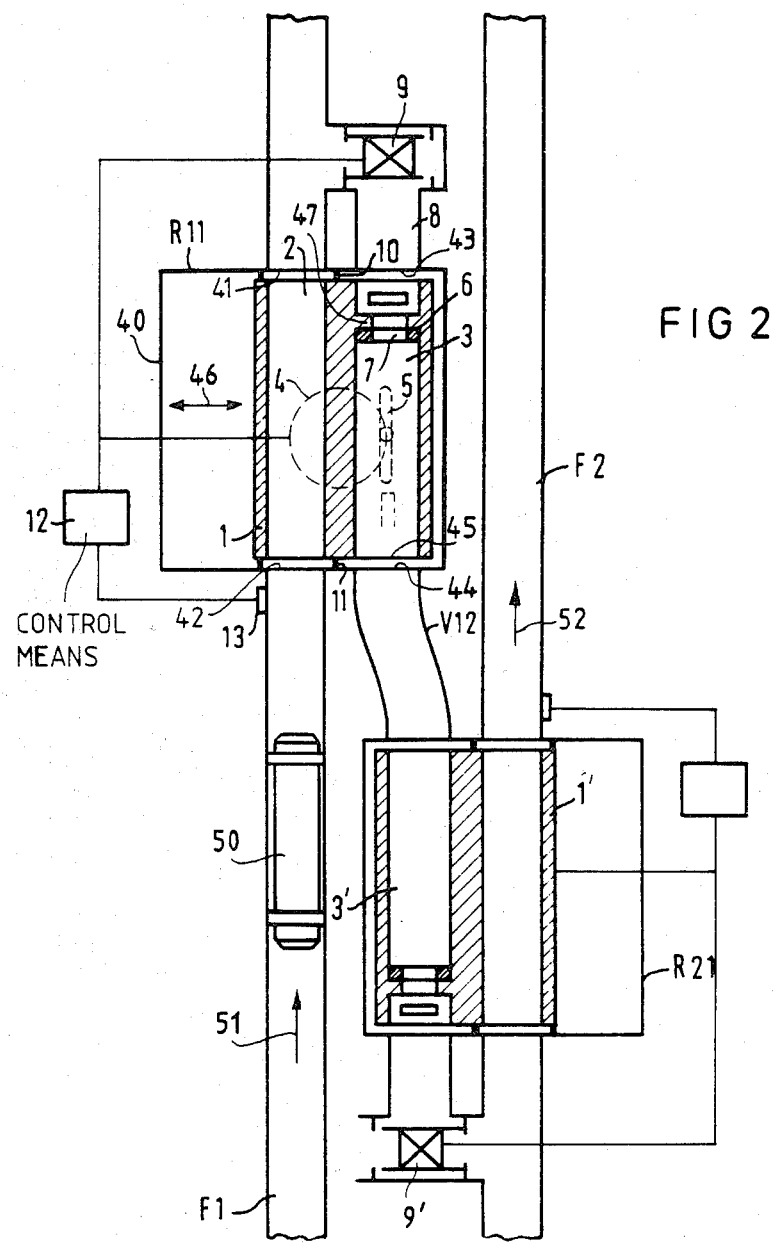
FIG. 2 is a schematic cross-section of two pneumatic post stations forming a connecting arrangement between a pair of forwarding tube paths.

A connecting means for the paths F1 and F2 is illustrated in FIG. 2 as including the post station R11, R21 and the interconnecting tube V12. As illustrated, both of the post stations R11 and R21 are identical in structure and use the same element numbers for identical parts or elements. However, to distinguish a part in station R11 from the same part in station R21, the element numbers in station R21 have a prime added.

As illustrated, each of the stations such as the station R11 has a housing 40 which has a pair of aligned ports 41 and 42 which are on opposite side walls and are connected to tube sections forming the forwarding tube path F1. In addition, the housing has two additional ports 43 and 44 which are aligned with each other and the port 44 is connected to the connecting tube V12. Within the housing 40, the station has a horizontally displaceable carrier member 1 which has a through-bore forming a first chamber 2 which is open at both ends and a second chamber 3 which is parallel to the first chamber 2 and has one open end 45. The carrier member 1 is movable in a horizontal direction as indicated by a double-headed arrow 46 by a moving means which comprises a scotch yoke arrangement with a crank 4 having a pin received in a groove 5 of the member 1 which groove 5 extends perpendicular to the direction 46. Thus, rotation of the crank 4 in a circle indicated in broken lines will shift the member 1 from a first position with the first chamber 2 in alignment with the ports 41 and 42 and the second chamber 3 having its open end 45 in alignment with a port 44 to the left as illustrated in FIG. 2 with the chamber 1 being out of alignment with the ports 41 and 42 and the chamber 3 moving into the previous position of the chamber 2 with the end 45 in communication with the port 42. The chamber 3 which is a reception tube chamber at an end opposite the end 45 is provided with retaining means which is illustrated as an inwardly extending annular projection 47 provided with an elastic buffer 6. As illustrated, the projection 47 creates an air passage opening 7 which is aligned with the port 43 which connects a feed line 8 to the housing 40. The feed line 8 has a three-way valve 9 which selectively connects the port 43 to either the air pressure in the tube section of the forwarding tube path F1 or to the outside air.

In the first position of the carrier member 1 as illustrated, the two post stations R11 and R21 as well as the two forwarding tube paths F1 and F2 are not set up for a transfer traffic therebetween. In other words, a pneumatic traveler or dispatch case 50 traveling in the path F1 will pass through the station R11 unimpeded. In a similar manner, any dispatch case traveling in the path F2 would also pass through the station R21 unimpeded.

In order to obtain faultless pneumatic conditions when the carriers 1 are in the first position, the parallel walls of the housing 40 which have the ports 41 and 42 are provided with sealing means which are illustrated as sealing rings 10 and 11 with combined mounting means. Preferably, the mounting means will urge or bias the sealing rings into sealing engagement with the end faces of the carrier 1.

Control means 12 will actuate the valve 9 and operate a drive motor not illustrated for rotating the crank arm 4. The control means 12 will receive input data from the control system which is not illustrated and also from a switch means 13 which is actuated by the passing of a dispatch case such as 50.

To transfer a dispatch case such as 50 from the forwarding tube path F1 into the forwarding tube path F2, the carrier member 1 of the post station R11 is first displaced to a second position with the reception chamber 3 in alignment with the port 42 and therefore the tube sections of the lower part of the path F1. A pneumatic traveler or case 50 moving in a direction of arrow 51 toward the post station R11 is thereby conveyed into the reception tube chamber 3 by means of the air stream maintained through the air passage opening 7 and will be retained in the chamber 3 during subsequent parallel displacement movement of the carrier 1 back to the first position illustrated in FIG. 2. Due to the influence of gravity, a case in the chamber 3 may fall through the connecting line V12 into the reception tube chamber 3' of the post station R21 after carrier 1 has been moved to the first position. If this occurs, the station R21 will have the case in its reception chamber 3' and by moving the carrier 1' of the station R21 to the second position, the case can then be introduced into the tube path F2 to move in the direction of arrow 52.

However, as mentioned hereinabove, the connecting tube line V12 is long, then assistance is necessary in moving the case between the two stations. Assuming the case is in the chamber 3 of station R11 and the valve 9 closes the feed line 8 to the air pressure in the tube sections of the path F1. By opening the valve 9' so that the chamber 3' of the carrier 1' of the station R21 is subjected to a suction in the path F2, then the case in the chamber 3 will be drawn through the tube V12 to the chamber 3'. After being received in the chamber 3' the carrier 1' can be moved to a position so that the chamber 3' is in alignment with the tube sections of the path F2 to allow introduction of the carrier into the path F2 to move in the direction of the arrow 52.

If the system is operating under a positive pressure instead of a suction, then after the case is in the chamber 3 of the carrier 1, the valve 9 is shifted so that a positive pressure is applied in line 8 to force the case through the connecting tube V12 into the reception chamber 3'. In order to accomplish this, the valve 9' is held in the illustrated position for venting the line 8' to ambient or the outside air.

Figure 3:
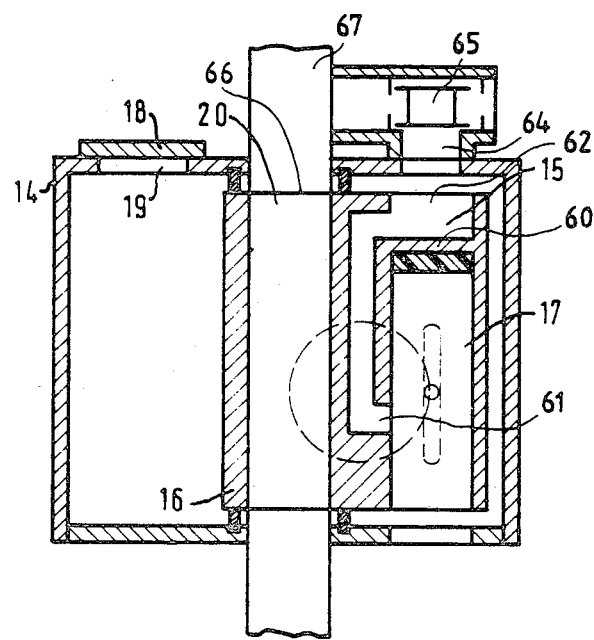
FIG. 3 is a cross-section of an embodiment of a pneumatic post station in accordance with the present invention.

An embodiment of the post station is illustrated by a pneumatic post station 14 in FIG. 3. The post station 14 essentially differs from the post station of FIG. 2 due to the port means and the retaining means. As illustrated, the retaining means has a transverse extending web 60 which extends across the second chamber 17 which is a reception tube chamber. The port means includes an air line or passage 15 which is in the carrier member 16 which has the first chamber 20 and the second chamber forming a reception chamber 17. The air line 15 has an opening 61 with the interior of the second chamber 17 which opening is spaced from the web 60. The other end of the air line 15 terminates in a port 62 which is coaxially aligned with the axis of the chamber 17 so that it is aligned with a feed line 64 having a valve such as a three-way valve 65 while the carrier is in the first position. Also, when the carrier is shifted to the second position with the chamber 17 in communication with the tubes forming the tube path, the port 62 will be in alignment with an inlet or port 66 for the tube section 67.

Another feature of the station 14 is that its housing has an introduction opening 19 which is provided with a cover 18. Thus, the station 14 can also be utilized not only for a post station used in transferring a case from one path to another but also as a station which will allow removing and introducing dispatch cases into the system. When the carrier 16 is in the second position with the reception chamber 17 in alignment with the path formed by the tube section such as 67, the first chamber 20 can receive a dispatch case being introduced into the system. Preferably means not illustrated are provided to retain the dispatch case within the chamber 20 until the chamber is moved back to the first position illustrated in FIG. 3

Although various minor modifications may be suggested by those versed in the art, it should be understood that I wish to embody within the scope of the patent granted hereon, all such modifications as reasonably and properly come within the scope of my contribution to the art.

I claim:

1. In a pneumatic dispatch system having a plurality of forwarding tube paths, each tube path comprising a plurality of tubular sections arranged in a single tube line for transporting pneumatic dispatch cases, and means for pneumatically transporting the dispatch cases in both directions along each tube line in a single-tube communication mode, said system having connecting means for selectively connecting two forwarding tube paths, said connecting means comprising each of the two tube paths having a pneumatic post station with a housing inserted between two sections of the single-tube line and a connecting tube line extending between the housings of the two post stations, each of said post stations having a first tube chamber open at each end and means for moving the first tube chamber in said housing between a first position in alignment with the two tube sections of the forwarding tube path and a second position out of alignment therewith, the improvements comprising each of the first chambers being connected to a second tube chamber extending parallel thereto, said second tube chamber being a reception chamber having one open end and a second end provided with retaining means for blocking passage of a dispatch case being pneumatically transported in the tube path when the second chamber is aligned with the tube sections of the forwarding tube path and retaining the case in the second chamber, said connecting tube line being connected to the housing of each station at a distance from the tube section of the tube path equal to the spacing between the axes of the first and second chambers so that when the first chamber is in the first position, the one open end of the reception chamber is aligned with the connecting tube line for transfer of a case therebetween, each of the second chambers having means for forming a port for passage of air communicating with the reception chamber at a point spaced from the one open end, and each of the housings of the post stations having a feed line, said feed line having one end connected to the forwarding tube path and the other end positioned for communication with the means for forming a port when the second chamber has the one open end aligned with the connecting tube line, said feed line having valve means for controlling the flow therein.

2. In a pneumatic dispatch system according to claim 1, wherein both of the post stations of the connecting device are identically constructed.

3. In a pneumatic dispatch system according to claim 1, wherein the means forming a port comprises an aperture formed by the retaining means at the second end.

4. In a pneumatic dispatch system according to claim 1, wherein the retaining means comprises a web closing the second end of the reception chamber, said means for forming a port being an opening in the side wall of said chamber spaced from said web to form an air pillow to decelerate an incoming dispatch case, said opening being connected to an air line discharging into said feed line when the reception chamber is aligned with the connecting tube line.

5. In a pneumatic dispatch system according to claim 4, wherein the air line extends laterally from the reception chamber and terminates in a port coaxially aligned with the axis of said chamber at said second end so that when the first chamber is moved to the second position, said port is in communication with one of the tube sections of the tube path.

6. In a pneumatic dispatch system according to claim 1, wherein the valve of the feed line is a three-way valve having a third port in communication with the outside atmosphere so that the means forming a port can be selectively connected to the outside atmosphere and the air pressure in the forwarding tube path.

7. In a pneumatic dispatch system according to claim 6, wherein the retaining means comprises a web completely closing the second end of the reception chamber, said means forming a port comprising an air passage having an opening in the side wall of the reception chamber and extending to a second opening on the axis of said chamber so that the means forming a port will be in communication with the air pressure of the forwarding tube path when the reception chamber is aligned with the tube sections thereof.

8. In a pneumatic dispatch system according to claim 6, wherein the retaining means comprises a projection extending into the interior of the reception chamber adjacent said second end and said means forming a port comprising the aperture formed by said means projecting into the interior of the chamber.

9. In a pneumatic dispatch system according to claim 1, wherein the first chamber and the reception chamber are formed in a common carrier having end faces engaged with the open ends of the first chamber and at least one open end of the reception chamber, said carrier being disposed in the housing with the end faces extending parallel to the adjacent walls of the housing.

10. In a pneumatic dispatch system according to claim 9, wherein the means for moving the first chamber moves the first chamber along a straight line and comprises a pin secured on a crank being received in a slot extending perpendicular to the direction of movement.

11. In a pneumatic dispatch system according to claim 9, which includes sealing rings, and means for mounting the rings on the walls of the housing to surround the inlets of the tube sections of the forwarding tube path.

12. In a pneumatic dispatch system according to claim 11, wherein the means for mounting the sealing rings resiliently bias them against the end faces of the carrier member.

13. In a pneumatic dispatch system having a plurality of forwarding tube paths, each tube path comprising a plurality of tubular sections arranged in a single tube line for transporting pneumatic dispatch cases, and means for pneumatically transporting the dispatch cases in both directions along each tube line in a single tube commutation mode, said system having connecting means for selectively connecting two forwarding tube paths, said connecting means comprising each of the two tube paths having a pneumatic post station with a housing having aligned ports connected to the tube sections of the single tube line and a tube port for a connecting tube line which extends between the housings of the two post stations, each of said post stations having a first tube chamber open at each end and means for moving the first tube chamber in said housing between a first position in alignment with the two aligned ports connected to the tube sections of the forwarding tube path and a second position out of alignment therewith, the improvement comprising each of the first chambers being formed in a carrier having a second tube chamber extending parallel thereto, said second tube chamber being a reception chamber having one open end and a second end provided with retaining means for blocking passage of a dispatch case being pneumatically transported in the tube path when the second chamber is aligned with the two ports connected to the tube sections of the forwarding tube path and retaining the case in the second chamber, said connecting tube line being connected to the housing at a connecting tube port which is spaced a distance from the aligned ports which is equal to the spacing between the axes of the first and second chambers so that when the first chamber is in the first position the one open end of the reception chamber is aligned with the connecting tube port for transfer of a case therebetween, said second chamber having port means forming a port in communication with the interior of the chamber at a point spaced from the one open end, and said housing having a feed line connected with one of the tube sections of the tube path and terminating at a point in communication with the port means when the reception chamber is aligned with the connecting tube line, said feed line having a valve to control flow therethrough.

14. In a pneumatic dispatch system according to claim 13, wherein the valve is a three-way valve having a third port connected to the atmosphere so that flow to the feed line into the port means can be selectively taken from the atmosphere and the forwarding tube path.

15. In a pneumatic dispatch system according to claim 14, wherein the retaining means comprises a projection extending from the interior of the second chamber adjacent the second end and the port means is formed by the aperture created by said projection.

16. In a pneumatic dispatch system according to claim 14, wherein the retaining means comprises a web extending across the second chamber, said port means having an opening spaced from the web and a passageway terminating in a port axially aligned with the axis of said reception chamber.

17. In a pneumatic dispatch system according to claim 13, wherein the retaining means comprises a projection extending from an internal surface of the reception chamber adjacent the second end forming an aperture and wherein said port means is formed by said aperture.

18. In a pneumatic dispatch system according to claim 13, wherein the retaining means comprises a web extending across the reception chamber adjacent said second end, said port means including a passageway having an opening to the interior of the reception chamber at a point spaced from the web and a second port at said second end axially aligned with the axis of said reception chamber.

* * * * *